United States Patent [19]

Azetsu

[11] Patent Number: 5,007,009

[45] Date of Patent: Apr. 9, 1991

[54] NON-RECOVERY PARALLEL DIVIDER CIRCUIT

[75] Inventor: Akihiro Azetsu, Suginami, Japan

[73] Assignee: Indata Systems Kabushiki Kaisha, Tokyo, Japan

[21] Appl. No.: 272,899

[22] Filed: Nov. 18, 1988

[30] Foreign Application Priority Data

Nov. 30, 1987 [JP] Japan .................. 62-302823

[51] Int. Cl.$^5$ .............................................. G06F 7/52
[52] U.S. Cl. .................................................. 364/764
[58] Field of Search ................ 364/764, 765, 766, 767

[56] References Cited

U.S. PATENT DOCUMENTS

| 3,257,548 | 6/1966 | Fleisher et al. | 364/766 |
| 3,803,393 | 4/1974 | Wang | 364/766 |
| 4,599,702 | 7/1986 | Tokumitsu | 364/764 |
| 4,718,031 | 1/1988 | Nukiyama | 364/754 |

Primary Examiner—Dale M. Shaw
Assistant Examiner—Long T. Nguyen
Attorney, Agent, or Firm—Wenderoth, Lind & Ponack

[57] ABSTRACT

This invention provides a dividing circuit includes plural arithmetic units wherein the input on the numerator side is expressed as $y_s$ while the input on the denominator side is expressed as $x_s$, and when the relationship $(y_s-x_s) \geq 0$ holds, each of the plural arithmetic units calculates the quotient as $Z_i$ with a remainder $R_s = y_2 - x_2$ while when the relationship $(y_s-x_s) < 0$ holds, it calculates the quotient $Z_i$ with a remainder $R_s = y_s$; the dividing circuit inputs denominator side input $x_s$ at the arithmetic units, and inputs the numerator side input $y_s$ in the unit of bits corresponding to the arithmetic units together with remainder data from the higher order digit down, and then determines the whole of said bit quotient data from the arithmetic units as the quotient, and the remainder data of the least significant digit arithmetic unit as the remainder.

8 Claims, 16 Drawing Sheets

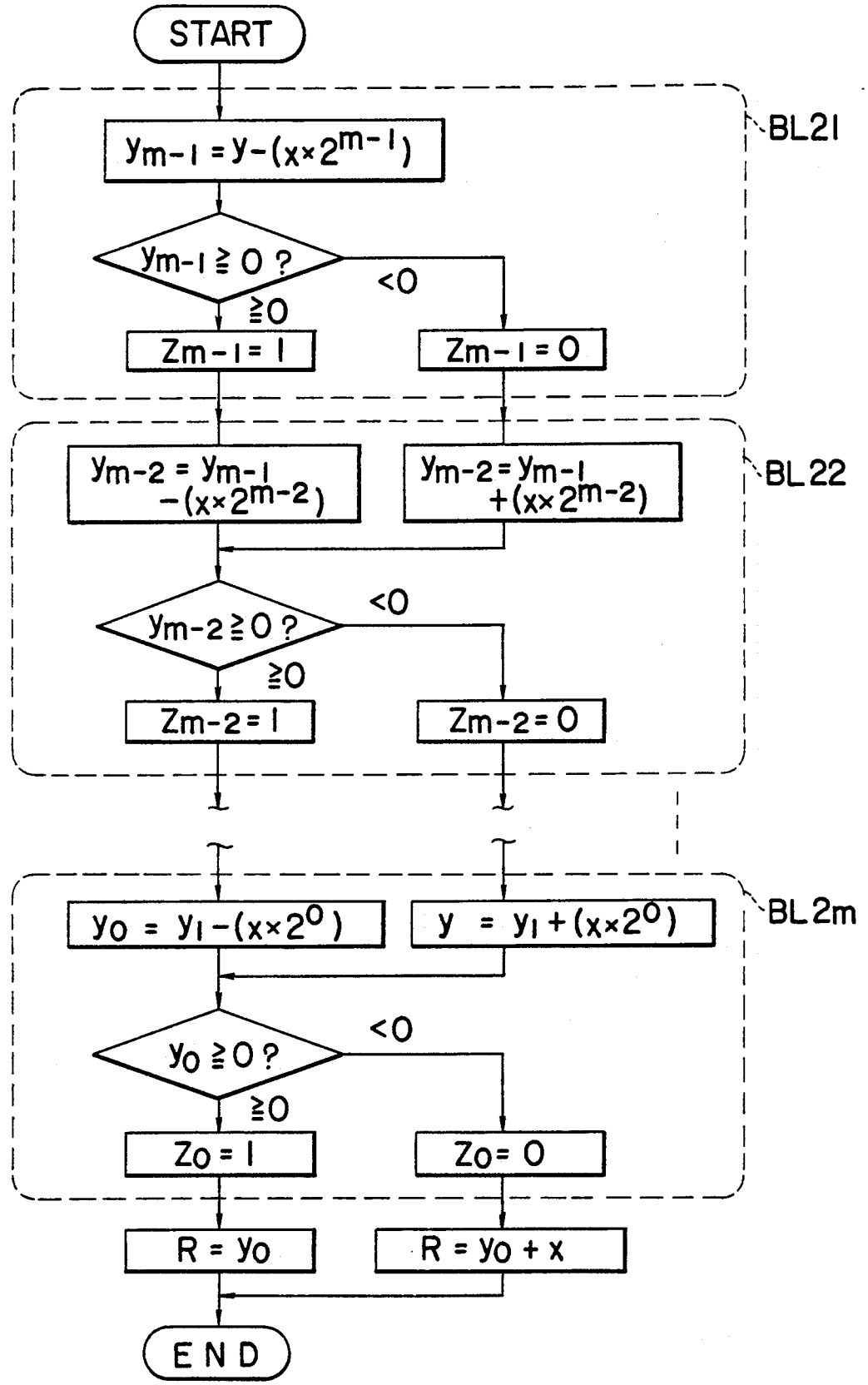
F I G. 10

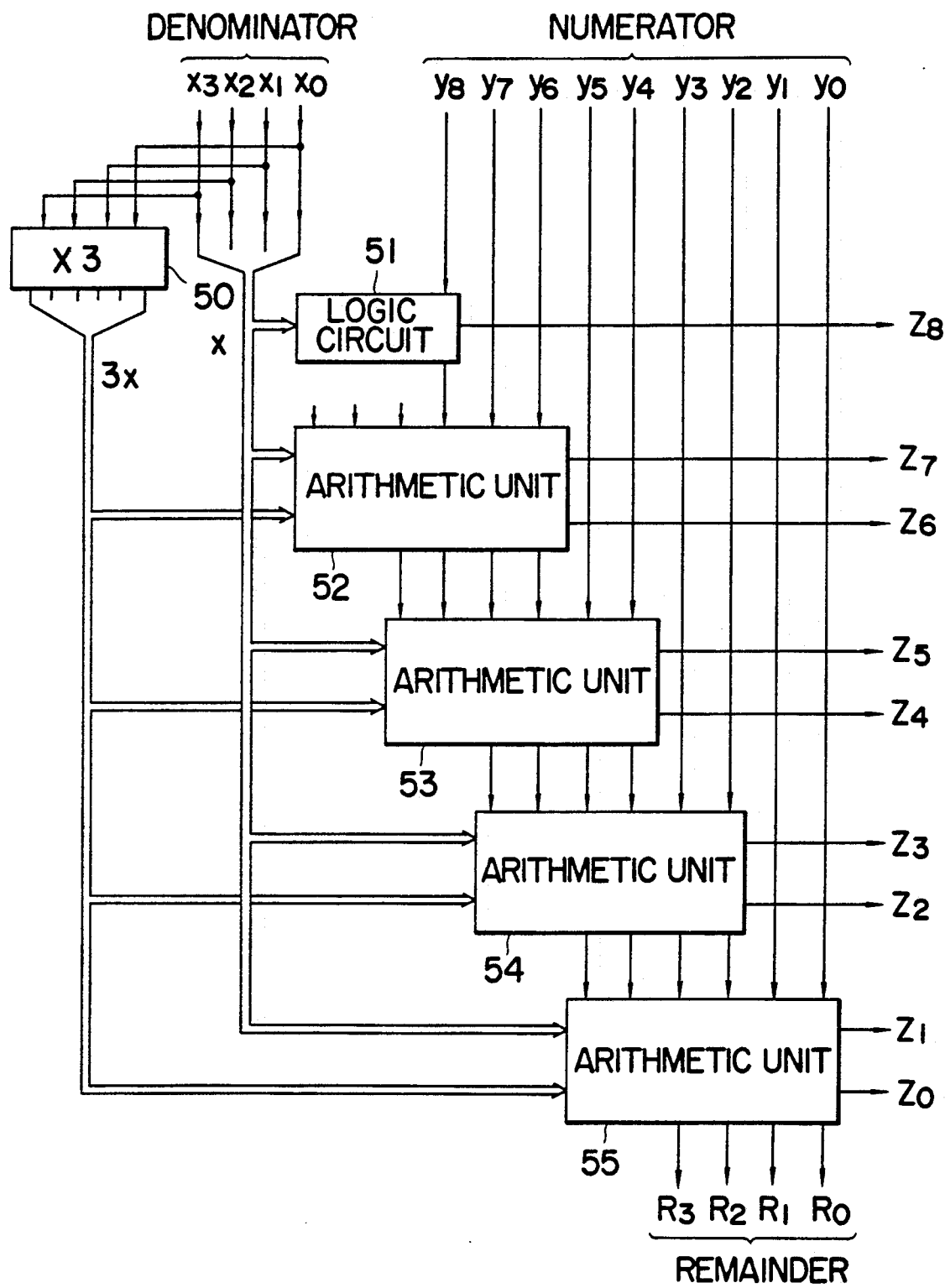
F I G. 14

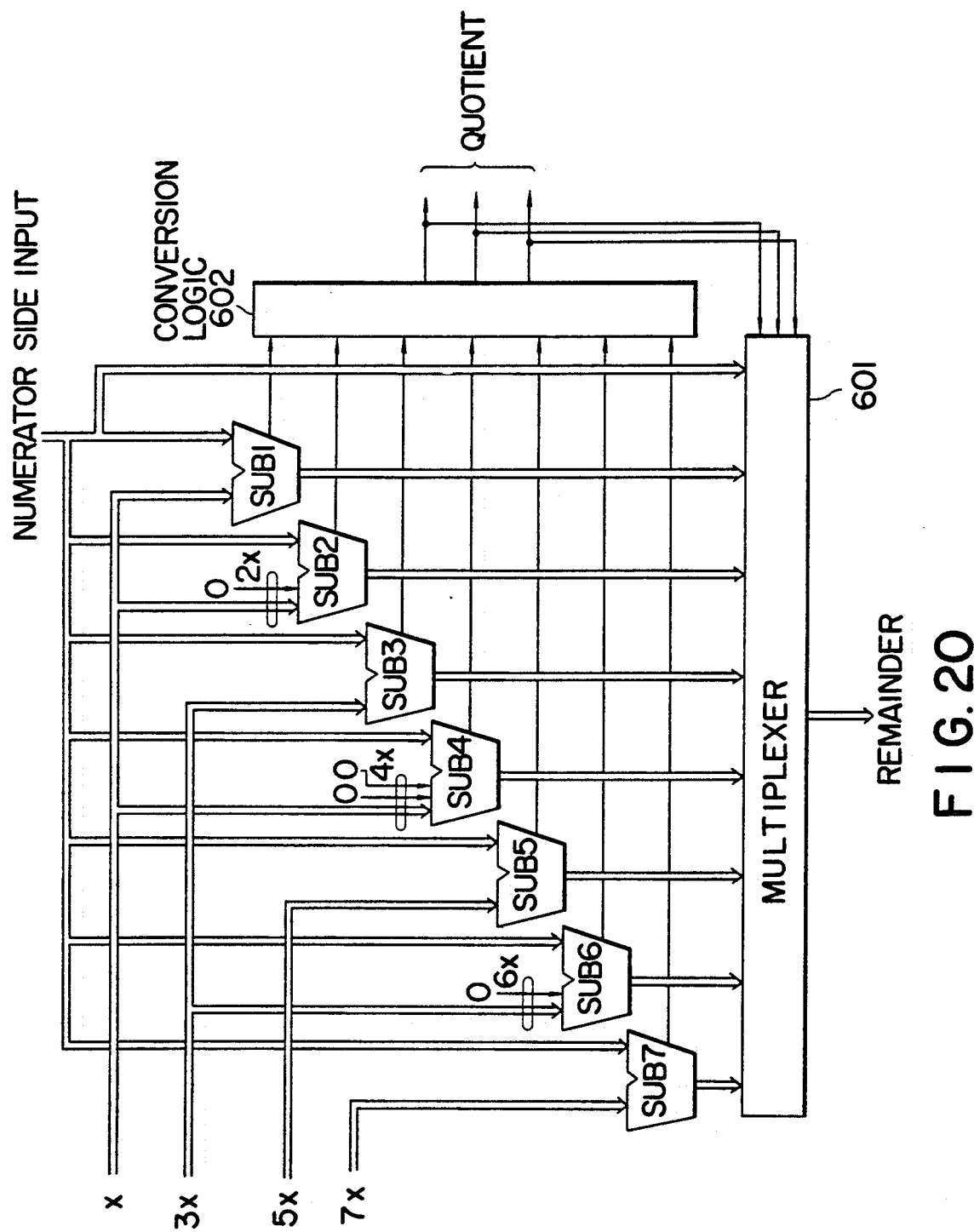
F I G. 20

NON-RECOVERY PARALLEL DIVIDER CIRCUIT

BACKGROUND OF THE INVENTION

This invention relates to a dividing circuit suitable for ICs (integrated circuits), and particularly to a parallel divider of a non-recovery type which can obtain plural bits simultaneously or to a structure of ICs for numerical operation using such a divider.

Digital operations can be processed in increasingly shorter time in recent years, and the speed of multiplication has remarkably increased as parallel operations are employed frequently. Dividing operations usually require plural steps. Demands are mounting for faster dividing operations in such fields as computer graphics and high speed signal processing.

The prior art digital dividing method is basically similar to a manual calculation wherein a divisor x divides a dividend y (x and y are positive integers) having the maximum of n bits to obtain a quotient y/x by processing it from the higher order position. The procedure is illustrated in FIG. 1 where a dividing operation is completed by repeating the loop for n times. This method is widely known, but is defective in that it takes a long time (or a large number of steps), and there have been proposed various and many improvements to overcome this defect. FIG. 2 shows one example of such an improvement which is called a non-recovery type method. This is because even if the result of a division becomes negative, it continues operation without recovery to positive. This method is popularly used in computers Although the non-recovery type method has greatly improved the speed over the basic method (referred to as the recovery method herein for comparison) or reduced the number of steps, the speed thereof has not yet quite met the demands.

When a higher speed is required in operation, an approximation which is represented by the Newton Raphson formula is usually used. For instance, a reciprocal number 1/x of a number x can be obtained as below if it can be approximated by $Z_i$.

$$x \times Z_i \rightarrow 1 \quad (1)$$

In other words, an error $\epsilon_i$ an be obtained by the following expression.

$$1 - x \times Z_i = \epsilon_i \quad (2)$$

With the error $\epsilon_i$, the approximate value $Z_i$ is modified to obtain the next approximate value $Z_{i+1}$. By repeating the operation to make $\epsilon$ less than a given value, Z at the time can be used as 1/x and y/x can be calculated as $y \times (1/x)$. Although the method requires multiplication, since multiplication can be processed at a high speed with present hardware technology, the operation as a whole can be conducted at a higher speed and performance. Yet, the Newton Raphson formula still needs a program of plural steps (a plural number of clocks when an exclusive hardware is used), the time required for division is still longer than that for multiplication.

SUMMARY OF THE INVENTION

This invention was conceived to eliminate such inconveniences as encountered in the prior art, and aims at providing a divider which can process dividing operations with a higher speed and precision.

Another object of this invention is to provide a divider suitable for circuit integration.

According to one aspect of this invention, for achieving the objects described above, there is provided a dividing circuit which comprises plural arithmetic units wherein the input on the numerator side expressed as $y_s$ while the input on the denominator side is expressed as $x_s$, and when the relationship $(y_s - x_s) \geq 0$ holds, each of said plural arithmetic units calculates the quotient as $Z_i$ with a remainder $R_s = y_s - x_s$ while when the relationship $(y_s - x_s) < 0$ holds, it calculates the quotient $Z_i$ with a remainder $R_s = y_s$; the dividing circuit inputs said denominator side input $x_s$ at said arithmetic units, and inputs said numerator side input $y_s$ in the bits corresponding to said arithmetic units together with remainder data from the higher order digit down, and then determines the whole of said bit quotient data from said arithmetic units as the quotient, and the remainder data of the least significant digit arithmetic unit as the remainder.

According to another aspect of this invention, there is provided a dividing circuit which comprises an inversion circuit which inverts denominator data x into $-x$, a most significant arithmetic unit which receives as input the most significant bit $y_m$ of the numerator data y and said denominator data x and which determines the quotient $Z_m = 1$ when $y_m < 0$ with the remainder $R_m = y_m - x$ and the quotient $Z_m = 0$ if $y_m \geq 0$ with the remainder $R_m = y_m$, plural digit arithmetic units which receive as input of numerator side data $y_s$ said numerator data in the second most significant to the least significant bits together with the remainder data of each high order digit, inputs said denominator data $+x$ and $-x$, determines $R_s = y_s + x$ when $y_s < 0$ and the remainder $R_s = y_s - x$ otherwise, and determines the quotient as $Z_i = 1$ when $R_s \geq 0$ and as $Z_i = 0$ otherwise, and a remainder processing circuit which inputs the remainder data of said digit arithmetic unit of the least significant digit and said denominator data x, controls addition of said remainder data $R_t$ with said denominator data x in correspondence to the most significant bit of said remainder data $R_t$, and determines the result of the addition as the remainder of y/x, and which is characterized in that the whole of the 1 bit quotient data from said most significant arthmetic unit and said digit arithmetic unit is determined as the quotient of y/x.

Further, according to still another aspect of this invention, there is provided a dividing circuit comprising a unit circuit which outputs data 3x in correspondence to the denominator data x, a logic circuit which receives as input said denominator data x and MSB of numerator data y and which outputs the maximum digit quotient, and a digit arithmetic unit which receives as input said, denominator data x and 3x and the data obtained by shifting said numerator data y by 2 bits and which outputs quotient data in the unit of 2 bits.

The nature, principle and utility of the invention will become more apparent from the following detailed description when read in conjunction with the accompanying drawings.

BRIEF DESCRIPTION OF THE DRAWINGS

In the accompanying drawings:

FIG. 10 is a flow chart used to show still another processing operation according to this invention;

FIG. 14 is a block diagram used to show the unit embodying the flow thereof;

FIG. 20 is a circuit diagram used to show details of the partial structure thereof.

DESCRIPTION OF THE PREFRERRED EMBODIMENT

Figure 4:
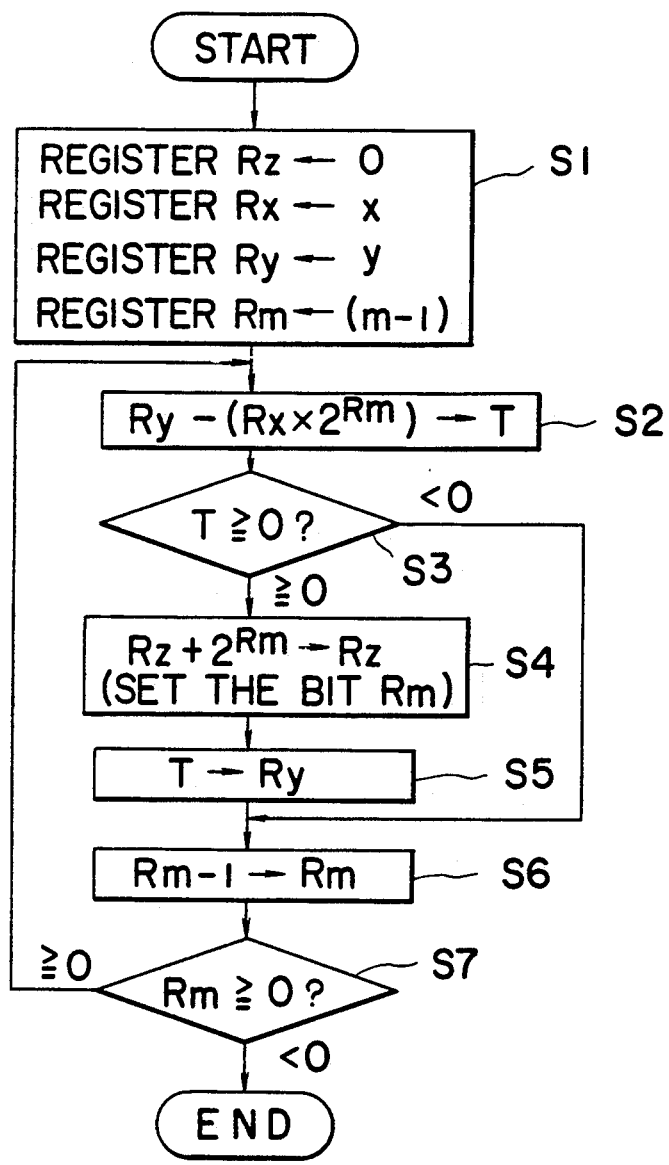
FIG. 4 is a flow chart used to show a dividing algorithm of the recovery type.

The dividing algorithm of the recovery type which is executable with software can be expressed by the flow chart shown in FIG. 4. In FIG. 4, the letter T denotes a temporary register; X is a denominator, and y is a numerator. They are all in binary numbers and usually integers. The steps from S2 to S7 are repeated for the m times of operation. The letter Z denotes a quotient INT (y/x), and R a remainder MOD (y,x). In this case, denominator x is of n bits while numerator y is of m bits. As they are not aligned at leading digits, quotient Z needs m bits. One bit is expressed by a subscript herein; for instance with $x_5$. The letter The letter $x_5$ expressed that it is the 6th bit from the LSB (least significant bit) of the denominator, and each bit is represented by either a "1" or "0".

Figure 5:
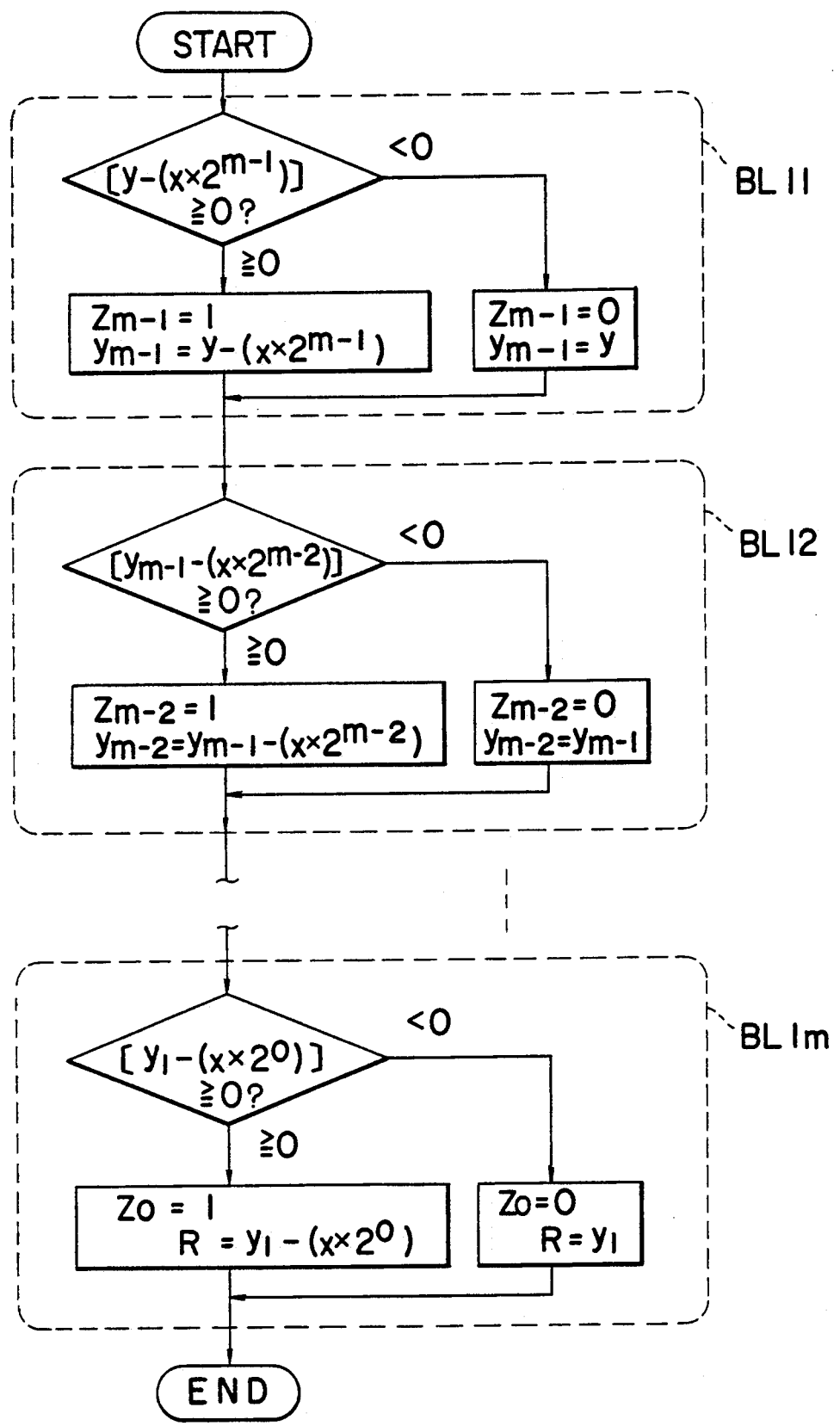
FIG. 5 is a flow chart used to show the processing flow shown in FIG. 3.

If this algorithm is developed in a manner not to include repetitive loops, the flow shown in FIG. 5 is obtained. In the flow chart FIG. 5, BL 11 in the first step is a block used to obtain the quotient whose most significant bit MSB=$Z_{m-1}$, the BL 12 on the second step is the one used to obtain the quotient $Z_{m-2}$, and BL 1 m on the m-th step is the one used to obtain $Z_o$.

Figure 1:
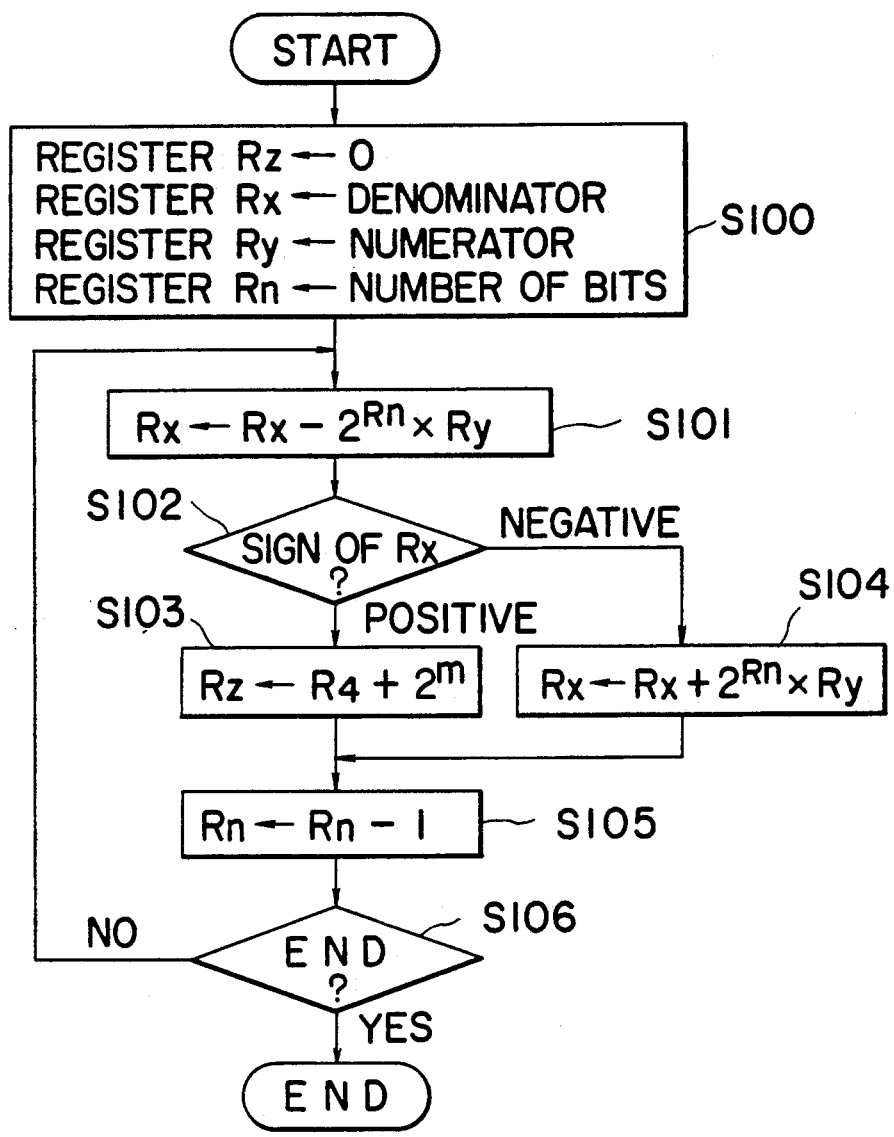
FIGS. 1 and 2 are flow charts used to show prior art dividing algorithms.
Figure 2:
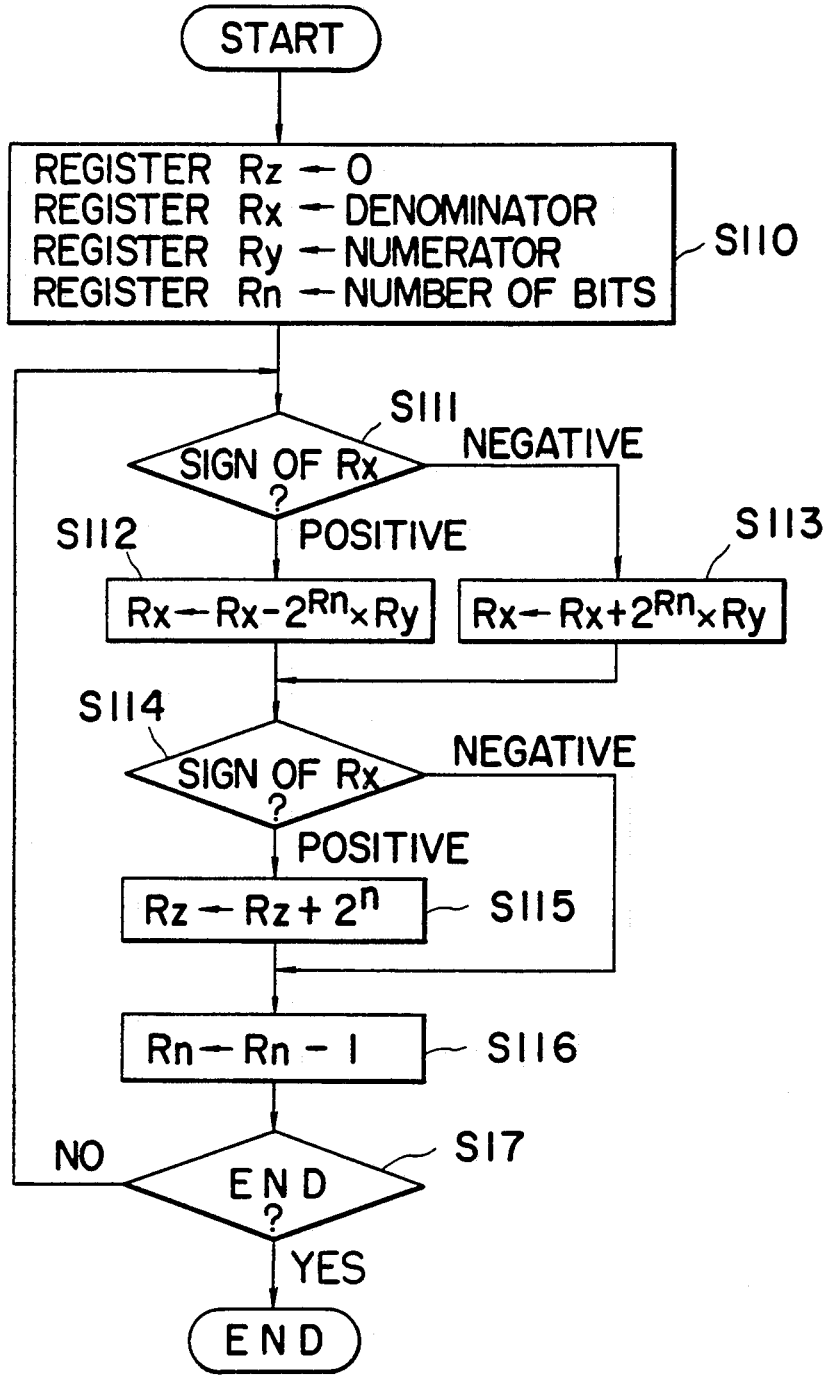
Figure 3:
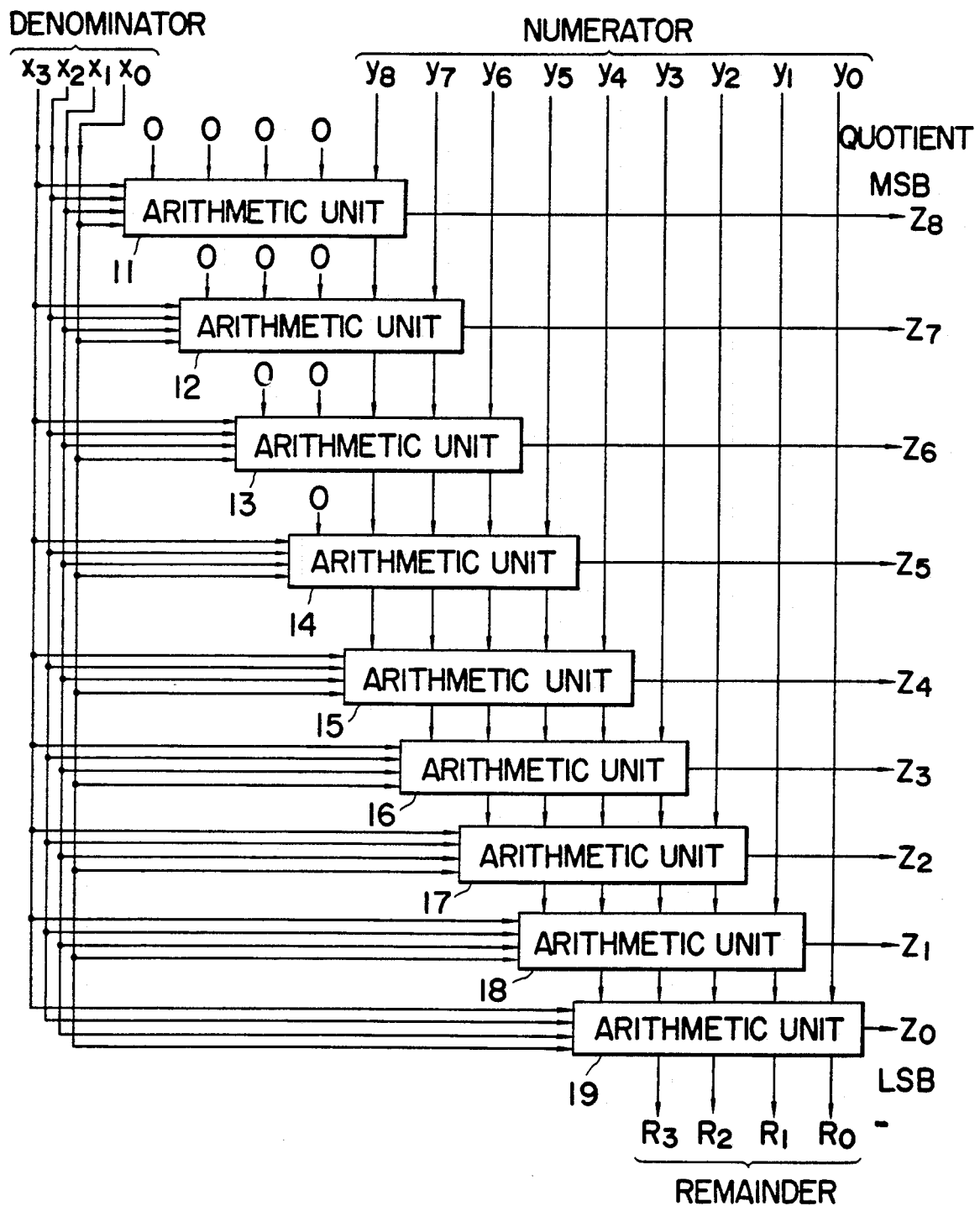
FIG. 3 is a block diagram used to show an embodiment of this invention.
Figure 6:
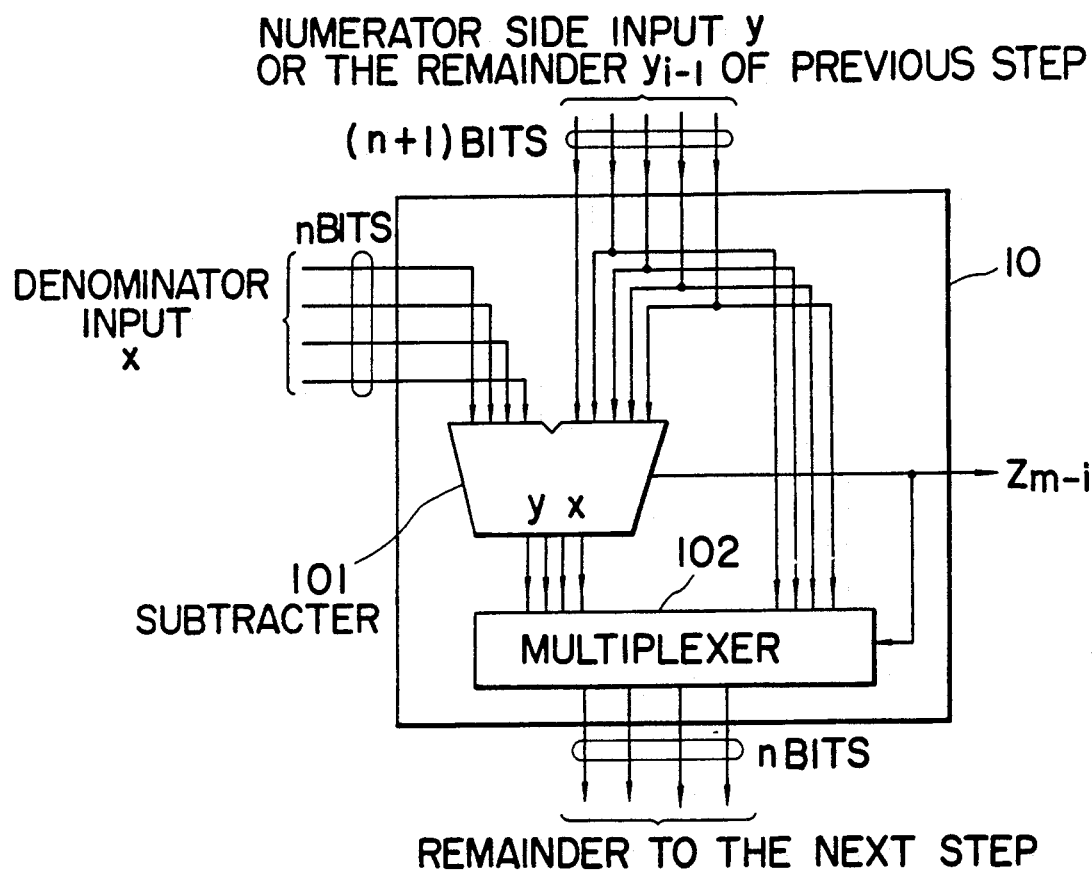
FIGS. 6 and 7 are block diagrams used to show embodiments of arithmetic units.

The flow chart of FIG. 5 is embodied with hardware to obtain a parallel dividing circuit. As the part of $2^i$ is a bit shift (in hardware, this is achieved by simply shifting signal lines), the structure becomes like the one shown in FIG. 3. FIG. 3 shows an example wherein m=9 and n=4 which are not aligned at leading digits. Arithmetic units 10 (11-19) of the same structure are provided, and a denominators $x_o$-$x_3$ are inputted at the arithmetic units 11-19 while numerators $y_o$-$y_8$ are inputted at the arithmetic units 19-11 but shifted by 1 bit. The unit 10 has such a function, that if $(y_s-x_s) \geq 0$ wherein the denominator input is $x_s$ and the numerator input is $y_s$, then quotient $Z_i$ becomes "1" and the remainder $R_s$ becomes $R_s=y_s-x_s$, and if $(y_s-x_s)<0$, then the quotient $Z_i$ becomes "0" and the remainder $R_s$ becomes $y_s$. The structure is examplified with the one shown in FIG. 6. In FIG. 6, the unit 10 is inputted with the denominator x of n bits and further with numerator side input y of (n+1) bits or with the remainder $y_{i-1}$ of the previous step. The unit has a subtracter 101 and a multiplexer 102. The quotient Z can be realized simply by using the carry-bit of the subtracter 101 (if y−x≧0, it becomes a logical "1"). The multiplexer 102 selectively outputs the output from the subtracter 101 when Z="1" and the numerator side input y when Z="0". The relationship $0 \leq y < (2 \times x)$ will explain why the numerator side input y is larger by 1 bit than the denominator side input x. In other words, when Z="0", the relationship $0 \leq y < x$ holds and when Z="1", the relationship $x \leq y < 2x$ holds.

Figure 7:
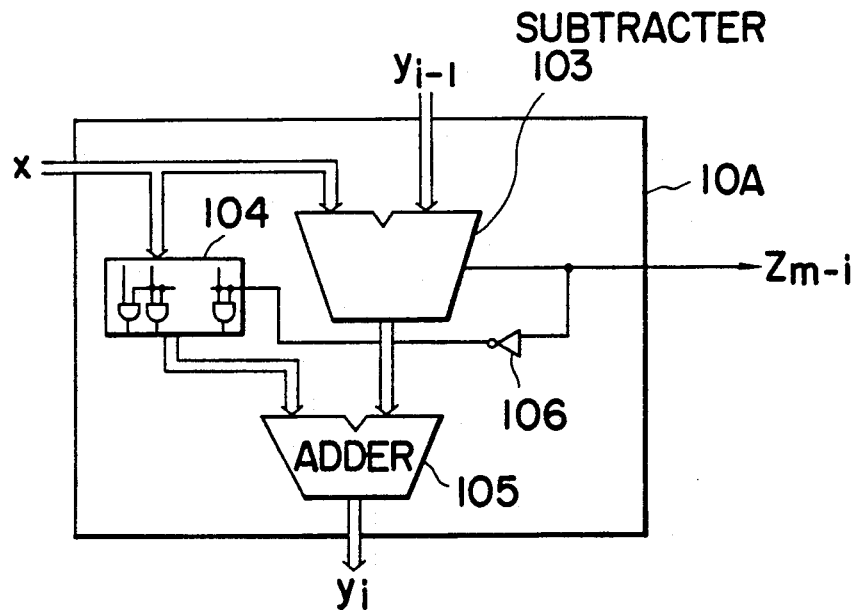

FIG. 7 shows another embodiment of the arithmetic unit wherein the result of the subtraction (y−x) obtained from the subtracter 103 is inputted to an adder 105. The denominator input x is inputted to a switching circuit 104 where if the quotient Z is "1", then the switching circuit 104 is turned OFF via an inverter 106, while if the quotient Z is "0", then the denominator input x is inputted to the adder 105. The switching circuit 104 may comprise a group comprising AND gates in a large number or multiplexers.

Figure 8:
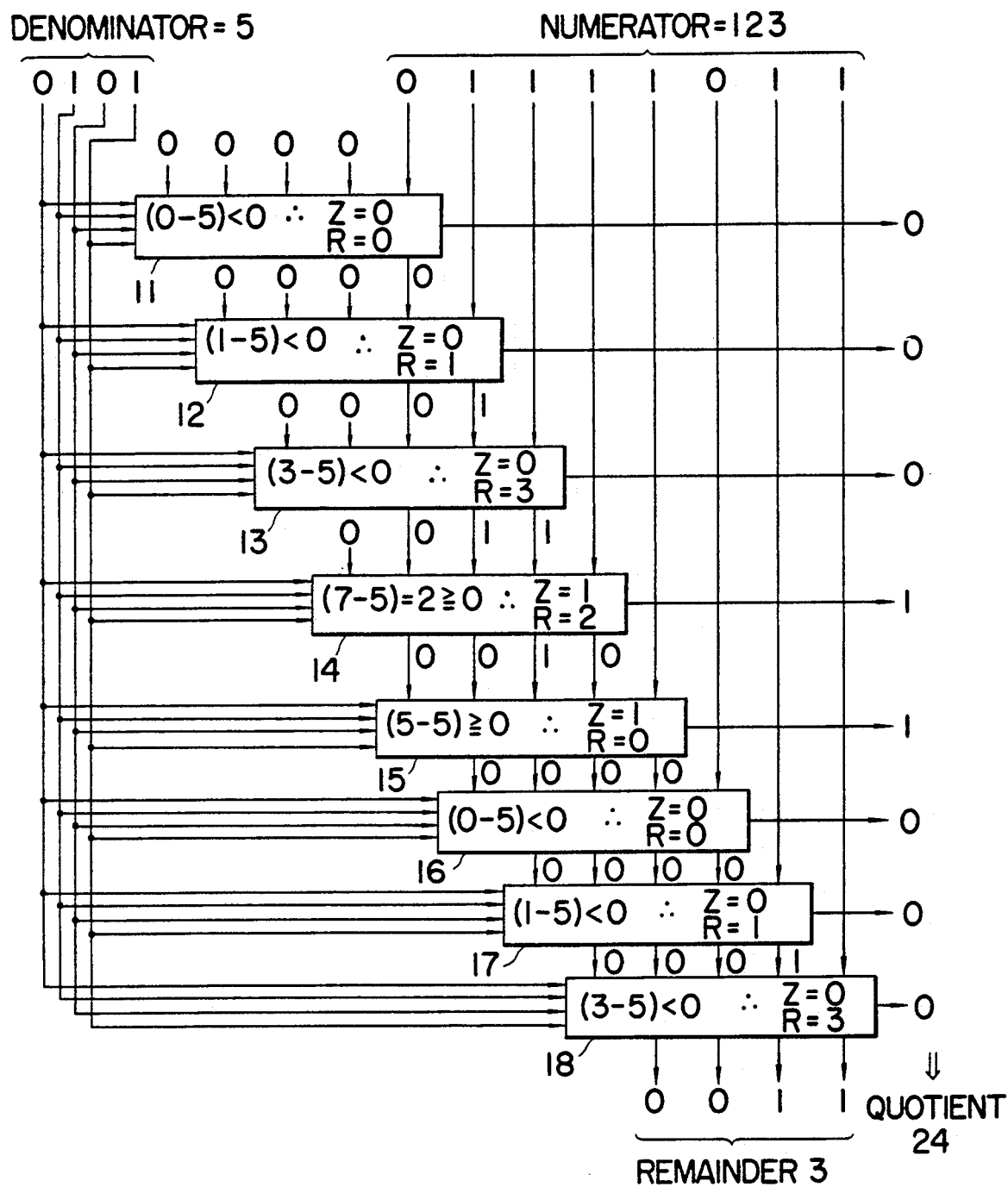
FIG. 8 is a chart used to show an actual numerical example.
Figure 9:
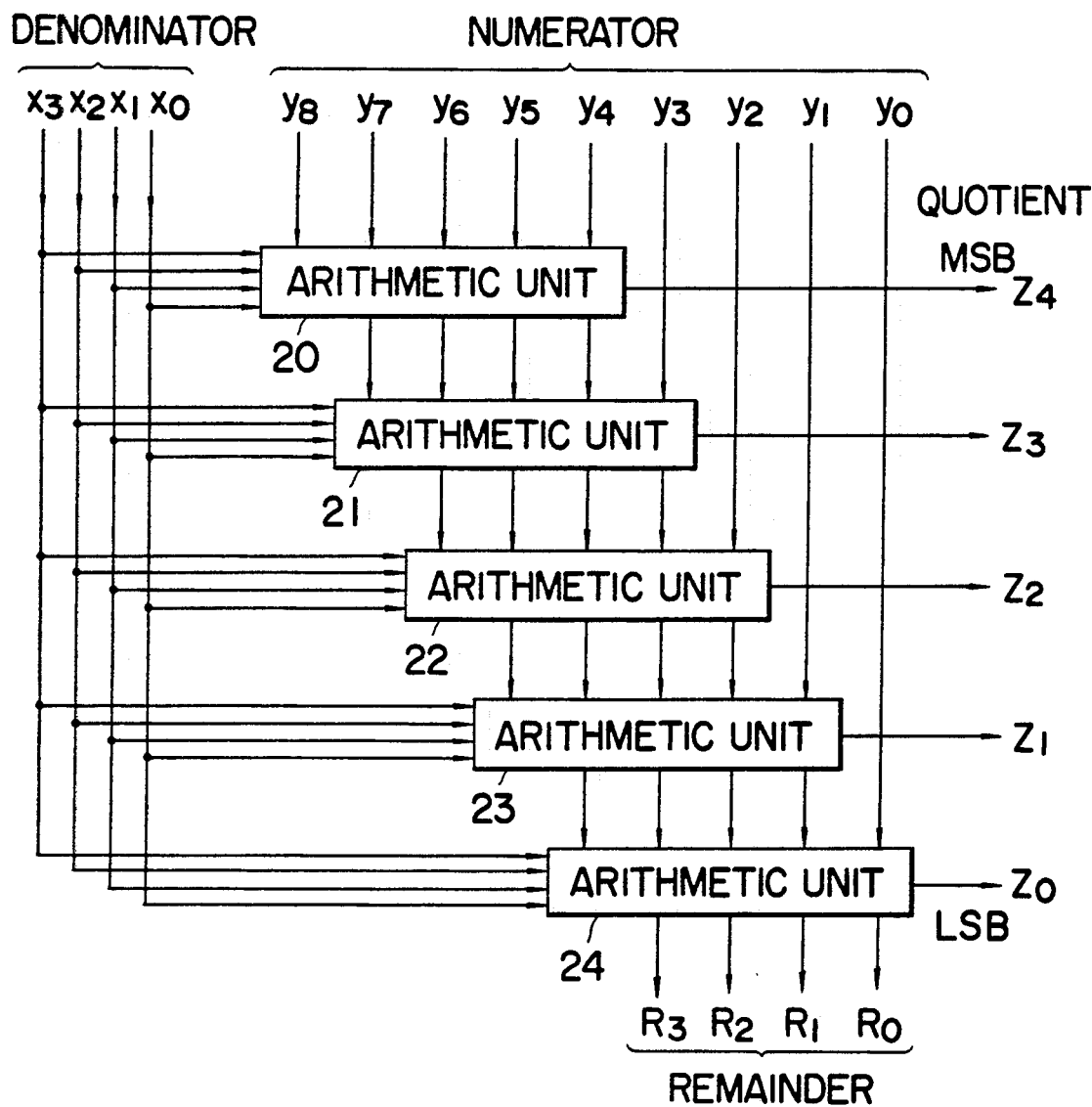
FIG. 9 is a block diagram used to show another embodiment of this invention.

When the numerator side input y of the divider shown in FIG. 3 is of 8 bits "01111011"=123 and the denominator x is made "0101"=5, the practical numerical relationship becomes the one shown in FIG. 8. It may be the structure shown in FIG. 9 if the quotient is (m−n) bit, by reasons such as that the leading digits are aligned in numerical values. In such a case, m which is the number of bits of the numerator y, is 9 while n, which is the number of bits of the denominator is 4, the arithmetic unit will be provided in the number of 5 or from 20 to 24 as m−n=9−4=5. The divider shown in FIG. 9 is characterized by the following:

(1) It is a completely asynchronous type and can be run at an high speed without the necessity of clock signals or registers. It may be converted into synchronous type (pipe line type) by providing registers at suitable positions. In such a case, it is most suitbale to pipeline processing at an extremely high speed.

(2) Even though the circuit scale is large, it is most suitable to circuit integration because it comprises relatively simple circuits of identical structure.

The divider shown in FIG. 3 requires an amount of time which can be calculated by adding the delay time of the subtracter and the delay time of the multiplexer every time input data (especially the numerators side input y) passes through one step. Accordingly, the total time needed for dividing is obtained by the following expression.

(The number of bits of the quotient)×[(delay time of the subtracter)+(delay time of the multiplexer)]

When the number of bits is large, this presents a problem. In order to solve such a problem, the algorithm shown in FIG. 10 is used. The quotient $Z_{m-1}$ of MSB is obtained by the operation block BL21 on the first step, and operation is repeated thereafter from the quotient $Z_{m-2}$ to finally obtain the quotient $Z_o$ of LSB. The remainder R is finally obtained. This algorithm is easily realized by the structure shown in FIG. 11. The details of each unit will be described referring to FIGS. 12A through 12C hereinafter, but the time required for the data to pass through each step unit is simply equal to the delay time of the adder, and the total time needed for division is obtained by the following expression.

[(number of bits of the quotient)+1]×(delay time of adder)

Figure 11:
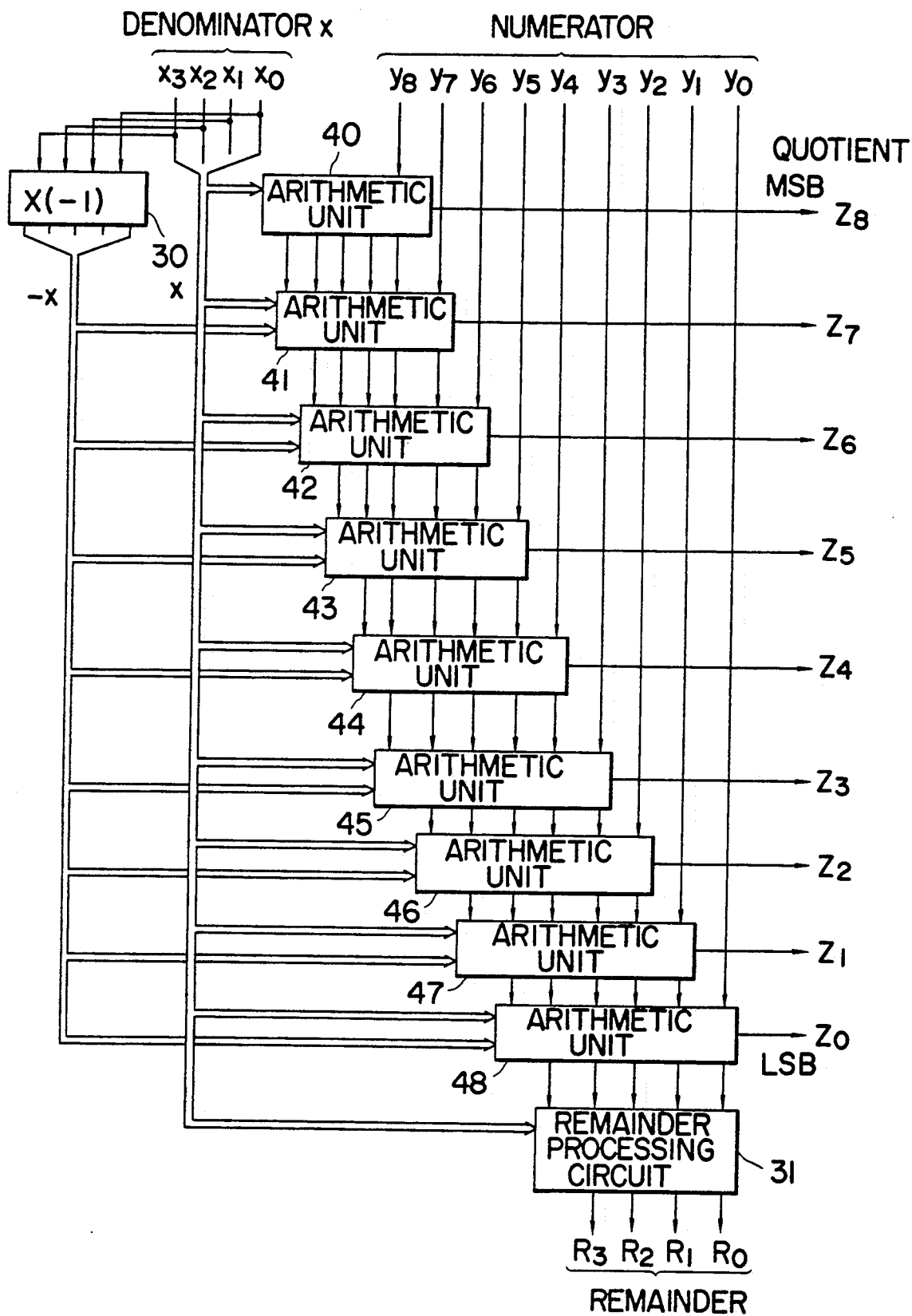
FIG. 11 is a block diagram used to show a unit embodying the flow shown in FIG. 10.

The speed is higher than the one required by the circuit of FIG. 3. The unit 30 in FIG. 11 is an inverter which inverts the symbols of the denominator x, and the inverted data x is inputted at the arithmetic units 41 through 48 on the second step and thereafter. The arithmetic unit 40 of the first step is used to obtain the MSB $Z_8$ of the quotient Z, and is adopted to output the result of subtraction to the next step when the quotient $Z_8$ is "1", and to output the numerator side input y if it is "0". The arithmetic units 41 through 48 on the second step and thereafter may select either positive x or negative −x as the numerical value on the side of the denominator, and the value is selected according to the sign of the output from the previous step. More particularly, the units 41 through 48 determine the remainder as $R_s = y_s + x$ if the input on the numerator side is $y_s < 0$, and $R_s = y_s - x$ otherwise. If the remainder $R_s \geq 0$, the quotient Z will be "1", and it will be "0" otherwise.

Figure 12A:
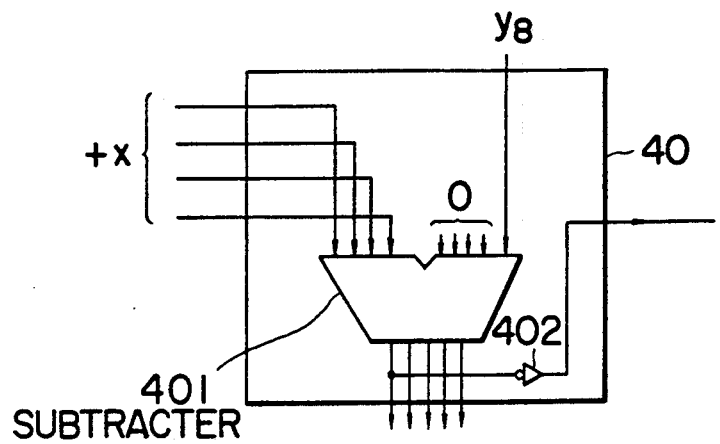
FIGS. 12A, 12B, 12C are circuit diagrams used to show details of respective structures.
Figure 12B:
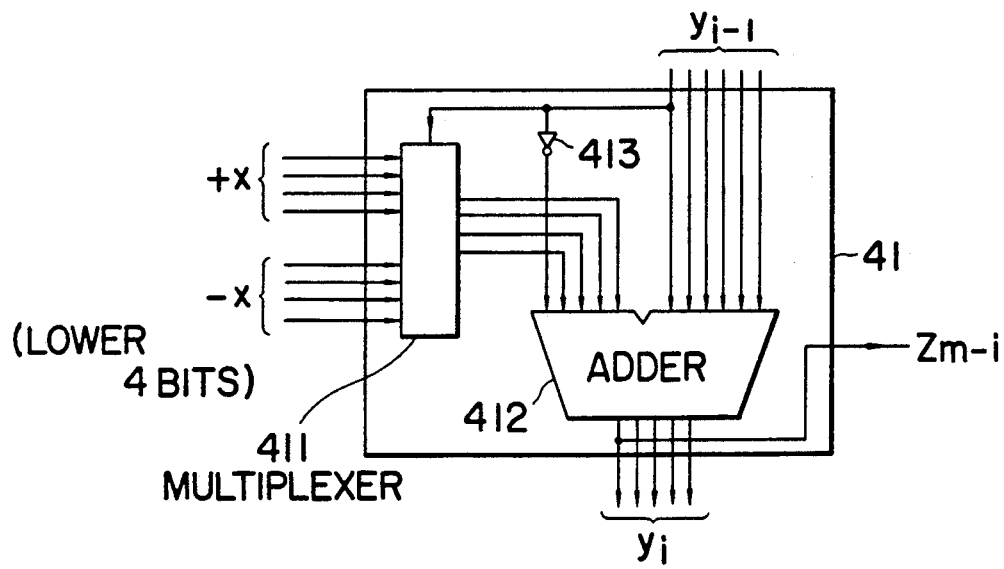
Figure 12C:
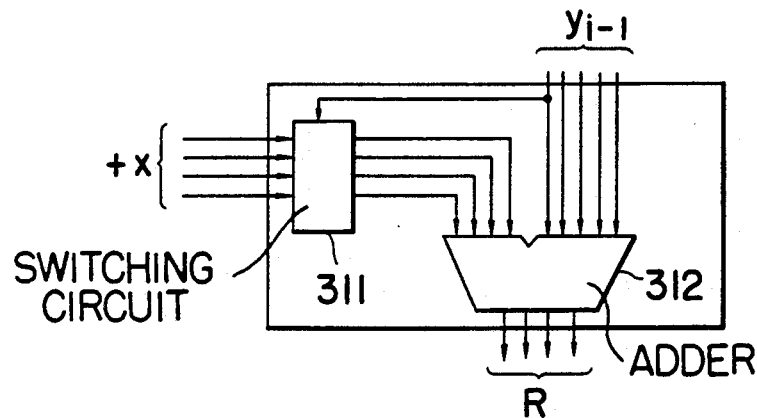

Units 40 through 48 in FIG. 11 may have the structures shown in FIGS. 12A through 12C. More particularly, the arithmetic unit 40 on the first step has the structure shown in FIG. 12A including a subtracter 401 and an inverter 402 which inverts the MSB of the result of subtraction. The units 41 through 48 on the second step and thereafter have the structure shown in FIG. 12B comprising a multiplexer 411 which inputs the denominator data, +x and −x, and selectively outputs, an inverter 413 which inverts the MSB of the numerator side input $y_{i-1}$, and an adder 412 which adds the data of denominator, +x and −x to the numerator side input $y_{i-1}$. The multiplexer 411 is adapted to select the denominator data +x when numerator side input $y_{i-1}$ is negative and denominator data −x when it is positive for inputting at the adder 412. A remainder processing circuit 31 may have the structure shown in FIG. 12C including a switching circuit 311 which controls the input of the denominator data +x with the MSB of the numerator side input for $y_{i-1}$ and an adder 312.

The table 1 compares the characteristics of the dividers shown in FIG. 3 and 11.

TABLE 1

| Conditions | Structure shown in FIG. 3 | Structure shown in FIG. 11 |
| --- | --- | --- |
| x: 4 bits | subtraction = 30 ns | addition = 30 ns |
| y: 9 bits | multiplexer = 15 ns | total dividing time = |
| Z: 9 bits | total dividing time = | 30 × 10 = 300 ns |
| (commercial MSI is used) | (30 + 15) × 9 = 405 ns | |
| x: 24 bits | subtraction = 10 ns | addition = 10 ns |
| y: 24 bits | multiplexer = 3 ns | total dividing time = |
| Z: 28 bits | total dividing time = | 10 × 29 = 290 ns |
| (LSI is used) | (10 + 3) × 28 = 364 ns | | wherein MSI: middle scale integration
LSI: large scale integration

Figure 13:
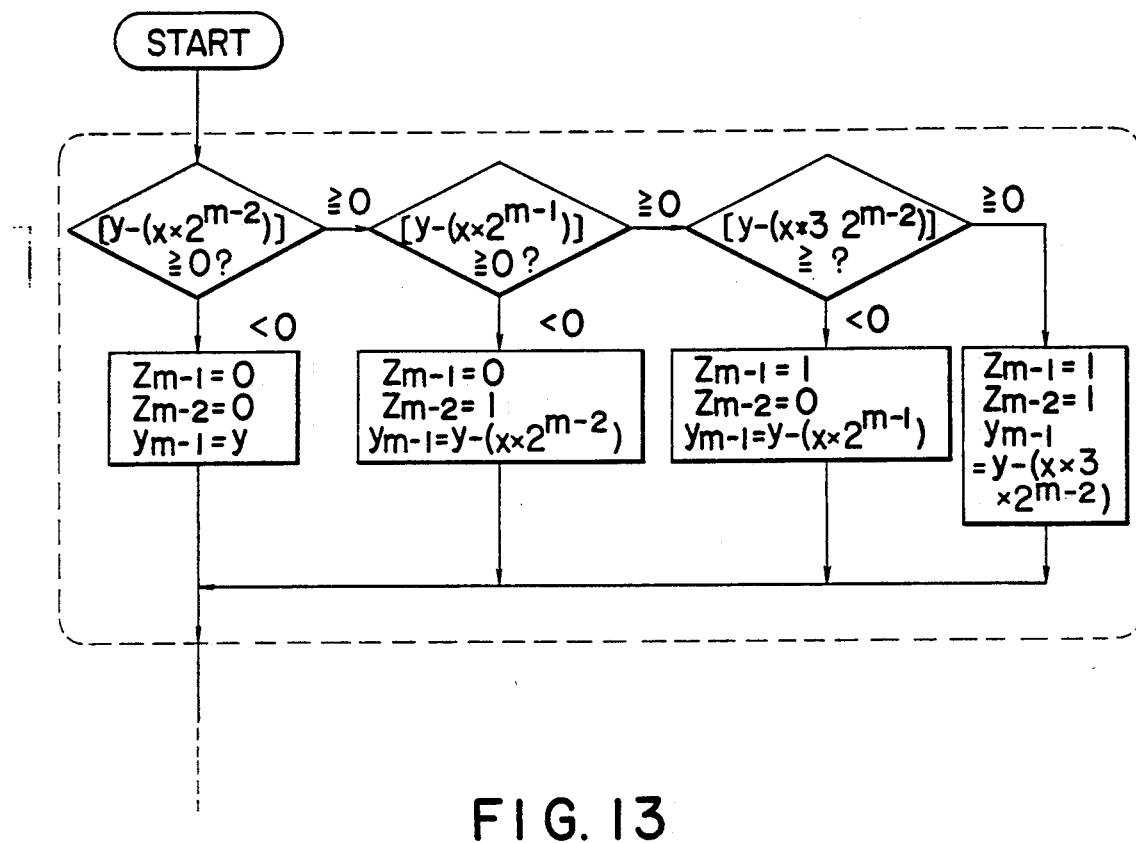
FIG. 13 is a flow chart used to show still another processing operation of this invention.

It is difficult to increase the processing speed for the circuit structure of FIG. 11 as it needs the same number of steps as the number of bits of the quotient. There has been proposed an algorithm shown in FIG. 13 to decrease the number of steps. FIG. 13 shows the first step alone. Compared to the manual calculation, this algorithm is described as the following step. An ordinary dividing operation is conducted digit by digit as the following example, when y=110110101 is divided by x=1011.

TABLE 2

```
                    ---100111
x3~x0 ... 1011  110110101 ... y8~y0
              1011         ... Since the relationship 1011 ≦ 1101
                               holds, 1011 (x) is subtracted.
              -----
              00101
                 0 ... Since the relationship 1011 < 101
                       holds, it is not subtracted.
              -----
              01010
                 0 ... Since the relationship 10111 < 1010
                       holes, it is not subtracted.
              -----
              10101
               1011
              -----
              10100
               1011
              -----
              10011
               1011
              -----
               1000 ... Remainder
```

On the other hand, the algorithm in FIG. 13 obtains the quotient in the unit of 2 bits. In short, the calculation is conducted as shown in Table 3.

TABLE 3

```
                        ── 1st time
                      ┌── 2nd time
                    ┌─── 3rd time
          ---10011
     1011 1101110101
          10110       Since the relationship 2x ≦ 11011 < 3x holds,
                      2x = 10110 is subtracted.
          -----
          10101       Since the relationship x ≦ 10101 < 2x holds,
                      x = 1011 is subtracted.
          -----
          101001
          100001      Since the relationship 3x ≦ 101001 holds,
                      3x = 100001 is subtracted.
          -----
           1000       Remainder
```

This method can reduce the number of necessary steps in hardware by one half (when the number of bits of quotient is an even number, the number of steps are reduced by one half, but when the number of steps is an odd number, the number of steps are reduced by one half +0.5) to thereby increase the processing speed remarkably. Although the calculation is conduted in the unit of 2 bits here, it may be conducted in the unit of 3 bits or moreover in one step.

Figure 17:
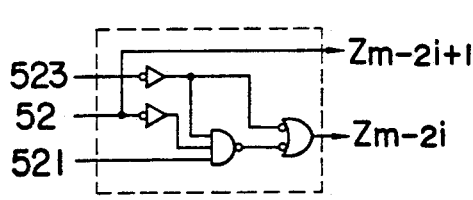
FIGS. 15, 16, 17, 18 are circuit diagrams used to show details of partial structures respectively.
Figure 18:
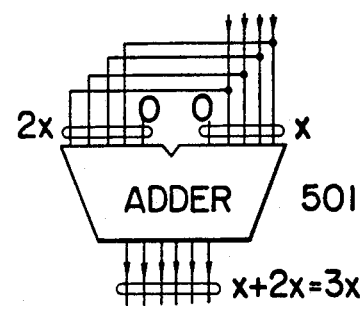
Figure 15:
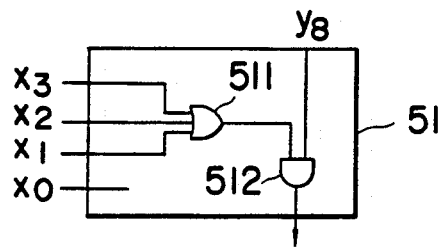
Figure 16:
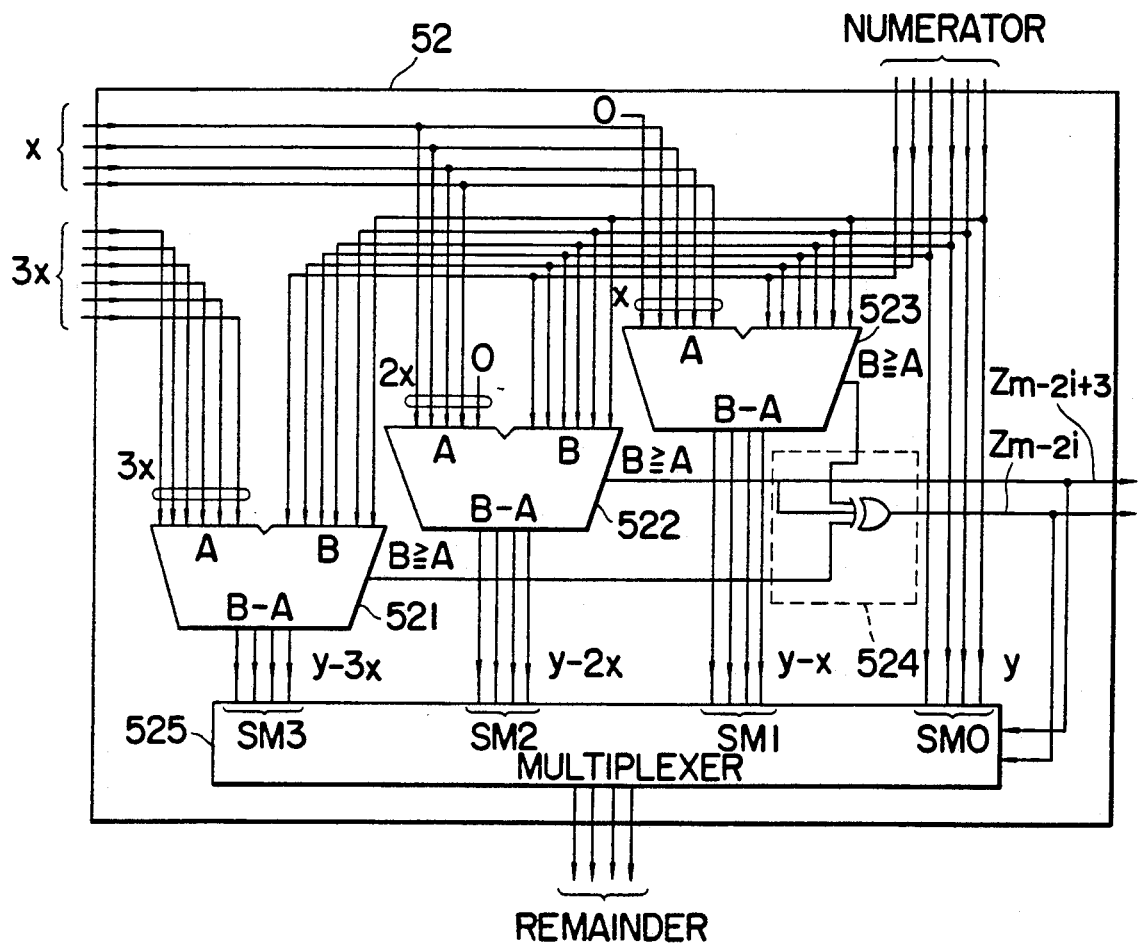

FIG. 14 shows an embodiment of structure in hardware where the quotient is calculated in the unit of 2 bits. The logic circuit 51 at the first step comprises an OR circuit 511 and an AND circuit 512 as shown in FIG. 15 and the arithmetic units 52-55 at the second step and thereafter are as shown in FIG. 16. FIG. 16 shows the structure of an arithmetic unit 52 comprising three subtracters 521-523, a conversion logic 524, and a multiplexer 525 which selectively outputs signals SMO-SM3. The conversion logic 524 may have the structure shown in FIG. 17. The unit 50 comprises an adder 501 as shown in FIG. 18.

The multiplexer 525 selectively outputs signals; more particularly when $(Z_{m-2i+n}, Z_{m-2i}) = (1,1)$, it outputs signal SM3; when it is (1,0), it outputs signal SM2; when it is (0,1) it outputs signal SM1; and when it is (0,0), it outputs signal SM0.

The structure shown in FIG. 14 is constructed to output 1 bit at the first step alone. This is because it runs the arithmetic operation of denominator ×3 while the numerator passes through the first step. This method generally increases the speed when the quotient of an odd number of bits is obtained in the unit of 2 bits. However, this is not essential, and division is possible even if units of 1 bit output and units of 2 bit output are combined arbitrarily.

The algorithm in FIG. 13 can process a division with the delay time which is one n-th (n denotes the number of bits which can be outputted by one step) of that needed by the method in FIG. 4 to thereby achieve an unprecedentedly high speed in processing. Although the scale of hardware becomes larger, they are suitable for cirucit integration because the same circuits are repeatedly used. When formed in ICs, the maximum speed may be achieved by increasing n to the maximum of integral scale. In other words, if large scaled circuits are integrated, even if the speed per internal gate is the same as before, it can surely achieve a higher speed in the dividing operation. This is an advantage rarely seen in the prior art digital arithmetic circuits, and is especially advantageous in building ICs.

Figure 19:
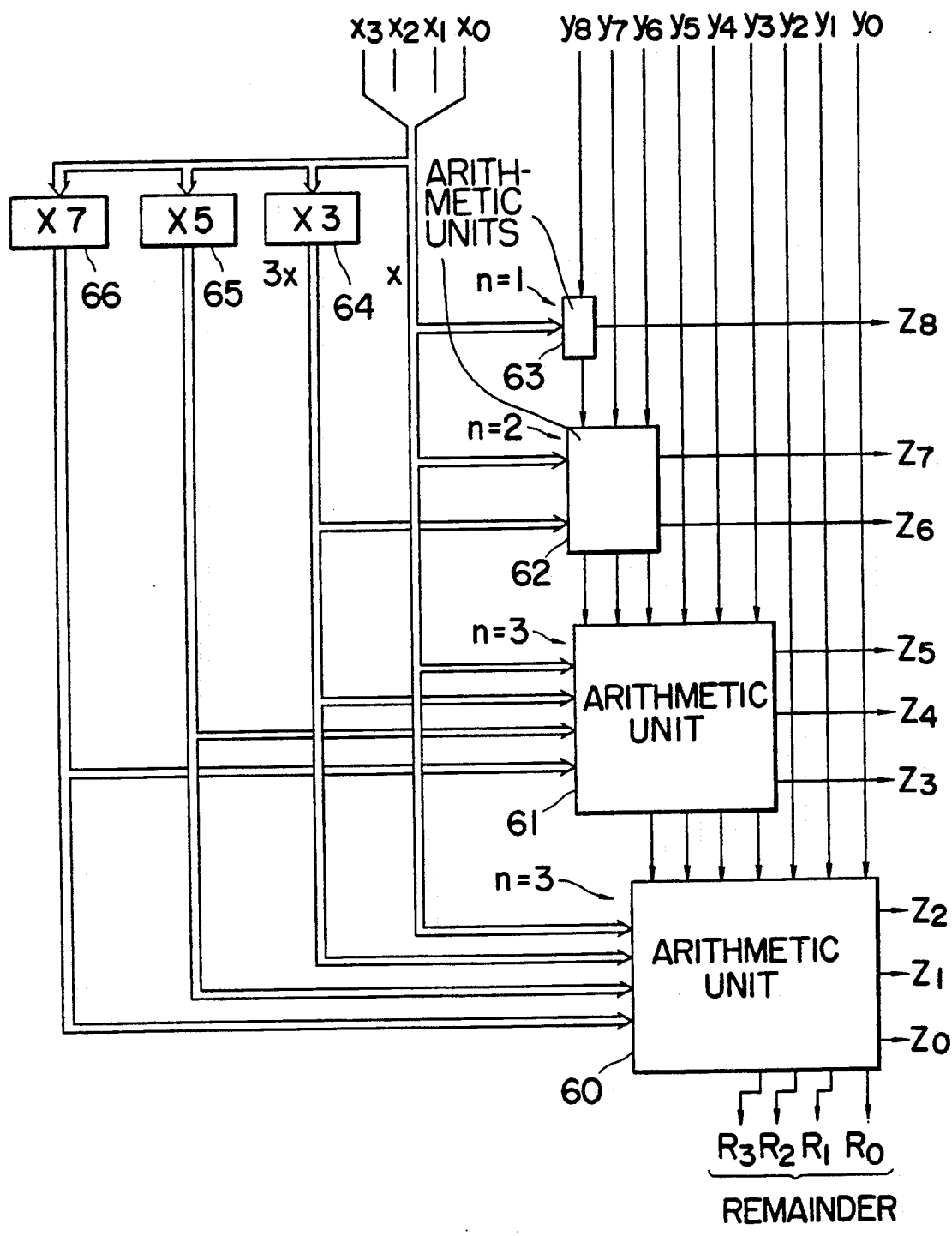
FIG. 19 is a block diagram used to show still another embodiment of this invention.

FIG. 19 shows an embodiment of a divider where n is set at 3 for the latter half of the process. The arithmetic unit 60 may have the structure shown in FIG. 20 to output 3 bits. Units 64–66 of $\times 3, \times 5$ and $\times 7$ may be realized by providing one each adder (or subtracter) circuit in accordance to the calculations of $x + 2x = 3x$, $x + 4x = 5x$, and $8x - x = 7x$.

As stated in detail in the foregoing statement, this invention dividing circuit includes arithmetic units each comprising an adder, a subtracter, and a multiplexer, and obtains an quotient from each arithmetic unit to thereby achieve increase of speed in operation. It is further extremely suitable for circuit integration as it comprises units of the same structure.

It should be understood that many modifications and adaptations of the invention will become apparent to those skilled in the art and it is intended to encompass such obvious modifications and changes in the scope of the claims appended hereto.

What is claimed is:

1. A dividing circuit which comprises:
    an inversion circuit which inverts received denominator data x into $-x$:
    a most significant arithmetic unit which receives as input the most significant bit $Y_m$ of numerator data Y and said denominator data x and which determines a quotient $Z_m = 1$ when $Y_m < 0$ with a remainder $R_m = Y_m - x$ and a quotient $Z_m = 0$ if $Y_m \geq 0$ with a remainder $R_m = Y_m$;
    a plurality of plural digit arithmetic units which are disposed so as to follow said most significant arithmetic unit and which are disposed in such a way that each plural digital arithmetic unit receives as an input thereto a remainder $R_s$ of a preceding digit arithmetic unit and one bit $Y_s$ in sequence out of the second most significant bit to the least significant bit, and receives as an input thereto said denominator data x and its inverted data $-x$, and determines the remainder $R_s = Y_s + x$ when $Y_s < 0$ and the remainder $R_s = Y_s - x$ otherwise, and determines a quotient as $Z_i = 1$ when $R_s \geq 0$ and as $Z_i = 0$ otherwise; and
    a remainder processing circuit which receives as an input thereto the remainder data $R_s$ of said digit arithmetic unit of the least significant digit and said denominator data x, and which controls the addition of said remainder data $R_s$ to said denominator data x in correspondence with the most significant bit of said remainder data $R_s$, and which determines the result of the addition as a remainder of y/x, and wherein said quotient $Z_m$ from said most significant arithmetic unit and each of said quotients $Z_i$ from said plurality of digit arithmetic units are regarded as bit data of a quotient of y/x.

2. The dividing circuit as claimed in claim 1, wherein said most significant arithmetic unit comprises a subtracter which subtracts said most significant bit $Y_m$ from said denominator data x.

3. The dividing circuit as claimed in claim 1, wherein said plural digit arithmetic units each comprise a multiplexer which selectively outputs either said denominator data x or its inverted data $-x$ according to a most significant bit of numerator side input $Y_{i-1}$, and an adder which receives as input an inverted output of said most significant bit, output from said multiplexer, and said numerator side input $Y_{i-1}$.

4. The dividing circuit as claimed in claim 1, wherein said remainder processing circuit comprises a switching circuit which receives as an input thereto said denominator data x and numerator side input $Y_{i-1}$, and which selectively outputs either said denominator data x or zero according to a most significant bit of said numerator side input $Y_{i-1}$, and an adder which adds an output from said switching circuit and said numerator side input $Y_{i-1}$.

5. A dividing circuit comprising:
    a unit circuit which outputs data 3x bearing a predetermined relationship to an input denominator data x:
    a logic circuit which receives as input said denominator data x and a most significant bit (MSB) of an input numerator data y and which outputs a remainder and a maximum digit quotient bearing a predetermined relationship to data x and data y, and
    a plurality of plural digit arithmetic units, which are disposed so as to follow said logic circuit and which are disposed in such a way that each plural digit arithmetic unit receives, as an input thereto, said denominator data x and said data 3x and a remainder of a preceding one and two bits in sequence out of the second most significant bit to the least significant bit of said numerator data y, and outputs quotient data in units of 2 bits and another remainder.

6. The dividing circuit as claimed in claim 5, wherein said logic circuit comprises an OR gate which has said denominator data x input thereto and an AND gate which has an output from said OR gate and said MSB of said numerator data y input thereto.

7. The dividing circuit as claimed in claim 5, wherein said unit circuit comprises an adder which adds said denominator data x and data 2x which is obtained from a means for shifting said denominator data x by 1 bit in a most significant bit direction.

8. The dividing circuit as claimed in claim 7, wherein each of said plural digit arithmetic units comprises: a first subtracter which outputs a comparison signal corresponding to a difference SM1 between said denominator data x and said numerator data y; a second subtracter which outputs a comparison signal corresponding to a difference SM2 between said data 2x and said numerator data y; a third subtracter which outputs a comparison signal corresponding to a difference SM3 between said data 3x and said numerator data y; a conversion logic which receives as input said comparison signals and outputs said quotient data in the unit of 2 bits; and a multiplexer which selectively outputs one of said differences selected from among said differences SM1 through SM3 and selected numerator data SM0 which is part of said numerator data y according to said quotient data outputted by said conversion logic.

* * * * *